United States Patent [19]
Freedenberg et al.

[11] Patent Number: 5,609,780
[45] Date of Patent: Mar. 11, 1997

[54] LASER SYSTEM

[75] Inventors: Candace J. F. Freedenberg, Poughkeepsie; Joshua M. Cobb, Millbrook; Uldis A. Ziemins, Poughkeepsie, all of N.Y.

[73] Assignee: International Business Machines, Corporation, Armonk, N.Y.

[21] Appl. No.: 337,799

[22] Filed: Nov. 14, 1994

[51] Int. Cl.$^6$ .................................................. B23K 26/06
[52] U.S. Cl. ............................... 219/121.73; 219/121.83; 385/119
[58] Field of Search ....................... 219/121.76, 121.77, 219/121.83, 121.73, 121.75; 356/121, 122; 385/33, 116, 119, 121

[56] References Cited

U.S. PATENT DOCUMENTS

| | | |
|---|---|---|
| 3,207,034 | 9/1965 | Harter . |
| 3,670,260 | 6/1972 | Koester et al. . |
| 3,997,240 | 12/1976 | Kebabian ................................ 385/133 |
| 4,170,400 | 10/1979 | Bach et al. ................................ 385/119 |
| 4,459,986 | 7/1984 | Karaki .................................. 219/121.83 |
| 4,475,027 | 10/1984 | Pressley ................................. 219/121.6 |
| 4,530,565 | 7/1985 | Markle ..................................... 385/121 |
| 4,561,721 | 12/1985 | Keilmann et al. ...................... 359/566 |
| 4,749,840 | 6/1988 | Piwczyk ............................... 219/121.68 |
| 4,793,694 | 12/1988 | Liu ...................................... 219/121.75 |
| 4,932,747 | 6/1990 | Russell et al. ....................... 219/121.79 |
| 4,940,508 | 7/1990 | Shamoulian et al. ...................... 216/17 |
| 5,067,811 | 11/1991 | Ouchi ...................................... 356/121 |
| 5,109,465 | 4/1992 | Klopotek ................................ 385/133 |
| 5,134,273 | 7/1992 | Wani et al. ........................... 219/121.62 |
| 5,382,770 | 1/1995 | Black et al. .......................... 219/121.83 |
| 5,406,042 | 4/1995 | Engelfriet et al. ................... 219/121.75 |
| 5,463,200 | 10/1995 | James et al. .......................... 219/121.75 |

FOREIGN PATENT DOCUMENTS 2-187294  7/1990  Japan .................................. 219/121.73

*Primary Examiner*—Geoffrey S. Evans
*Attorney, Agent, or Firm*—Whitham, Curtis, Whitham & McGinn

[57] ABSTRACT

A laser system which utilizes a reflective objective lens includes a closed loop servo and beam profiling system to provide improved uniformity of the laser beam impinging on the work piece. The laser beam is passed through an aperture to pattern the work piece. A beamsplitter separates the laser beam into workpiece and diagnostic beams. The workpiece and diagnostic beams are both passed through identical reflective objective lenses, to accurately measures performance of the work piece beam. Preferably, a third reflective objective lens collimates the diagnostic beam and directs it to a beam analyzer where the uniformity can be accurately assessed. The information determined by the beam analyzer is then used to position a pre-aperture converging optic (PACO) located between the laser source and the aperture. Adjustments in the x- and y-dimensions of the PACO lens change the angular uniformity at the aperture. Adjustments in the z-dimension of the PACO lens adjust the energy density delivered to the work piece. Homogenizing the laser light provides increased spatial uniformity. In one technique, a fiber optic bundle randomly redistributes the gaussian input energy to achieve spatial uniformity. Preferably, the output end of the fiber optic bundle is annular in shape, while the input end is rectangular to effectively capture light output from a laser, and prevents or reduces energy losses. In another technique, a fine mesh screen or combination of screens is inserted into the path of the laser beam prior to the aperture. The screen or combination of screens is positioned with respected to the converging lens and aperture or mask such that both spatial and angular uniformity result at the mask or aperture planed, and, hence, the work plane.

29 Claims, 4 Drawing Sheets

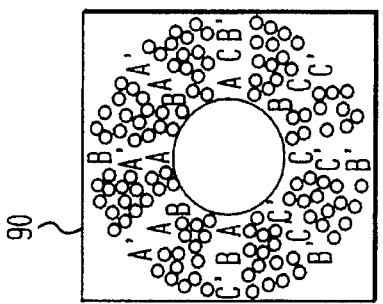
FIG. 5C
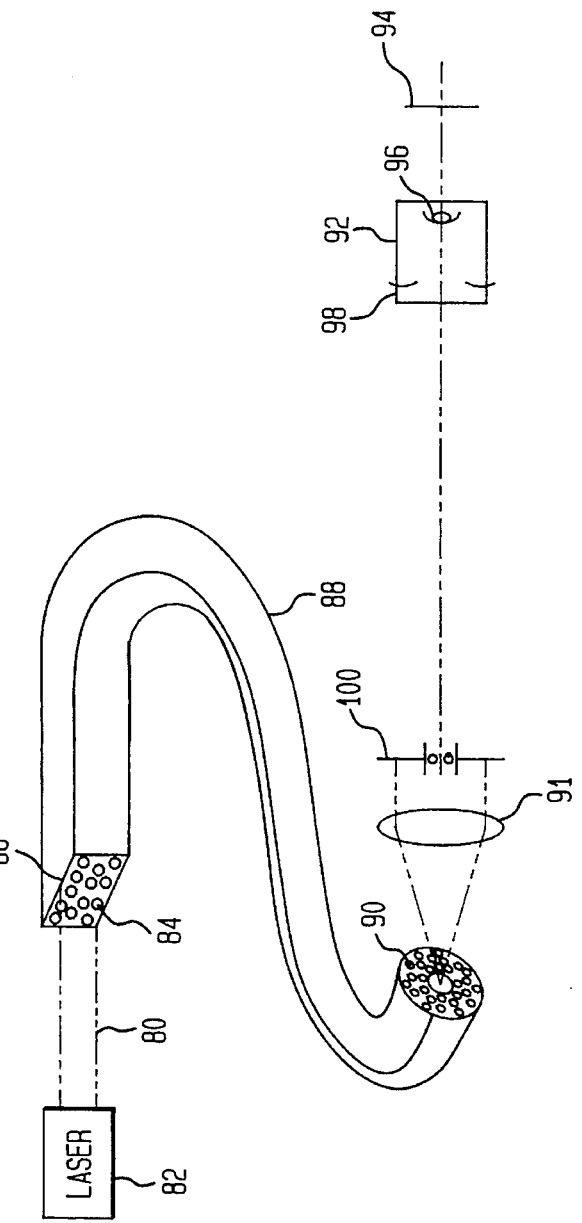
FIG. 4
FIG. 5B
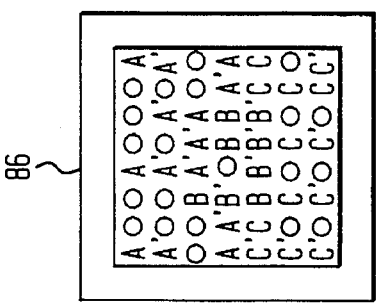
FIG. 5A

LASER SYSTEM

BACKGROUND OF THE INVENTION

1. Field of the Invention

The invention is generally related to laser systems and, more particularly, to measurement techniques and apparatuses of laser systems that are used for material processing.

2. Description of the Prior Art

Laser tools are commonly used for material processing in the manufacture of micro-electronic circuits. For example, in integrated circuit fabrication processes laser tools are employed for such material processing applications as ablation, deposition, impurity implantation, radiation induced chemical processes, hardening, and annealing, to name a few.

Controlling the intensity and uniformity of the laser beam impinging on the work surface material is particularly important in delicate operations such as etching down to a specific layer in multilayer device, while leaving the underlying layers undisturbed.

A wide variety of techniques for measuring and/or adjusting laser intensity are known. U.S. Pat. No. 4,459,986 to Karaki discloses a technique for measuring laser energy output from a surgical tool. In operation, a partially transmissive mirror located near the work end of a flexible light guide allows a portion of the laser energy to impinge on a heat sink. A thermocouple senses changes in the heatsink and produces a signal that is used to globally adjust the laser energy from the source. Although this technique measures laser energy at the output, it fails to offer a solution to accurately measuring either energy or beam uniformity at the work surface. U.S. Pat. No. 5,134,273 to Wani et al. discloses globally controlling the output energy of a pulsed light source wherein a portion of the laser light is sampled with a photodetector. The signal from the photodetector is then used to adjust a high voltage power supply that the fires the laser. U.S. Pat. No. 4,940,508 discloses a laser ablation tool wherein a computer controlled attenuator globally adjusts the laser energy impinging on a work piece by inserting different combinations of attenuator plates in the path of the laser beam. U.S. Pat. No. 4,561,721 to Keilmann et al. discloses the use of a wire mesh for laser attenuation. Different mesh structures are inserted into the path of the laser beam, preferably at an angle different than 90° to avoid reflecting energy back to the laser supply, to attenuate the laser energy independently of temperature and of the wavelength of the radiation. While these methods globally control or alter the energy of the output beam, they do not provide mechanisms to accurately measure and finitely control the energy of the beam impinging on the material.

A wide variety of techniques for improving the uniform beam intensity spatially across a beam, often referred to as homogenizing, are known. U.S. Pat. No. 3,670,260 to Koester discloses the use of a wedge type homogenizer in an optical beam forming device. In operation, the wedge type homogenizer divides a beam into a plurality of extensive zones, and then the light is diffused in each zone. U.S. Pat. No. 3,997,240 to Kebabian discloses an optical system that provides a uniform angle of illumination to an interference filter. Kebabian contemplates disposing a focusing means a focal length from the output of a homogenizer and using the focusing means to collimate the incident light into the interference filter. U.S. Pat. No. 4,475,027 to Pressley discloses the use of segmented cylindrical optical elements in an optical beam homogenizer. These elements are difficult and expensive to produce. In addition, they are difficult to align. U.S. Pat. No. 4,793,694 to Liu discloses homogenization of a laser beam by first seperating a central portion of the beam from the two edges, and then combining the central portion with the side portions using mirror pairs disposed along the axis of the laser beam. U.S. Pat. No. 5,109,465 to Klopoteck discloses a beam homogenizer which relies on a complex cylindrical elongated light transmissive wave guide. Klopotek relies on a reflective technique (total internal reflection) that requires complicated angular alignment. While these methods are sufficient for some applications in laser material processing, many advantages are gained by employing reflective objectives, and these methods are incompatible with such objectives.

Many prior art light transmission systems employ fiber optic bundles. U.S. Pat. No. 3,207,034 to Harter discloses a periscopic sight for a submarine which includes fiber optic bundles which are converted from a square configuration to an elliptical configuration, and from the elliptical configuration back to a square configuration. U.S. Pat. No. 4,170,400 to Bach et al. discloses the use of a fiber optic bundle for wide angle cameras and projectors. The wide angle image is converted to a non-distorted rectangular form using fiber optic bundles that have one face in the form of a partial annulus and the other face in a rectangular shape. U.S. Pat. No. 4,530,565 to Markle discloses a fused silica optical transformer that has a circular or rectangular shape at one end and an arcuate shape at the other end. Markle employs curved strip waveguides instead of optical fibers. U.S. Pat. No. 4,932,747 to Russell et al. shows a fiber bundle homogenizer for an excimer laser where the output face is custom shaped for a specific illumination pattern.

Excimer lasers are often used for small area ablation and deletion of surface and sub-surface materials. Leaders in the industry have struggled to produce devices which will improve the uniformity of the surface profiles from these ablations. Poor uniformity is due to non-uniformity of the laser source, surface material interaction, increases in incident energy and many other factors. While attempting to improve beam uniformity, it is also difficult to control the laser light angularly to prevent losses in resolution or energy.

Reflective optics have been employed in prior art laser systems. U.S. Pat. No. 4,749,840 to Piwczyk discloses a laser irradiation system which includes a reflective objective, a light source, and an eyepiece, whereby materials on a work piece are ablated while viewing the work piece. In Piwczyk, split lenses are used to divide and recombine the beam to circumvent the central obscuration of the reflective objective, thus allowing higher energy transmission through the reflective optic and better uniformity.

SUMMARY OF THE INVENTION

It is an object of this invention to provide a system for accurately measuring beam uniformity in a laser imaging system which utilizes reflective optics to image an aperture or mask onto a work piece.

It is another object of this invention to provide a laser imaging system which includes a real-time beam uniformity adjustment system.

It is another object of this invention to provide a laser imaging system with a means for achieving a uniform spatial intensity profile and for reducing the loss which normally occurs when a laser beam is passed through a reflective optics type lens.

It is another object of this invention to provide a laser imaging system with a low cost and effective means for providing spatially and angularly homogenous laser light.

According to the invention, laser imaging systems which employ reflective objectives to image an aperture or mask located at an "object plane" will have a spatial uniformity at the image located in the "image plane" which is dependent on upon both the spatial uniformity and the angular uniformity of the laser light at the object plane. Laser imaging systems which employ reflective objectives are improved by considering both the spatial and angular uniformity of the laser beam emanating from an aperture or mask that is projected onto a work piece. Spatial uniformity measurements are used in a closed loop feedback system. By making adjustments which affect the spatial and angular uniformity at the object plane, detection of and finite control of the laser energy or intensity across the beam cross-section at the work surface is improved. Improvements are also made in delivering light of both uniform spatial and angular intensity through the objective lens system. This invention also contemplates homogenizing the light beam with a fiber optic bundle or an array of mesh screens. The fiber optic bundle can be arranged in an array which allows for reduced laser energy losses across a reflective objective lens while spatial and angular homogenization is achieved.

BRIEF DESCRIPTION OF THE DRAWINGS

The foregoing and other objects, aspects and advantages will be better understood from the following detailed description of the preferred embodiments of the invention with reference to the drawings, in which:

FIG. 4 is a schematic diagram of a fiber optic sub-system designed to improve the spatial intensity of light at the aperture, and maximize the energy through the system;

FIGS. 5a–c are input end, side, and output end views of the fiber optic bundle shown in FIG. 4.

DETAILED DESCRIPTION OF THE PREFERRED EMBODIMENTS OF THE INVENTION

Figure 1A:
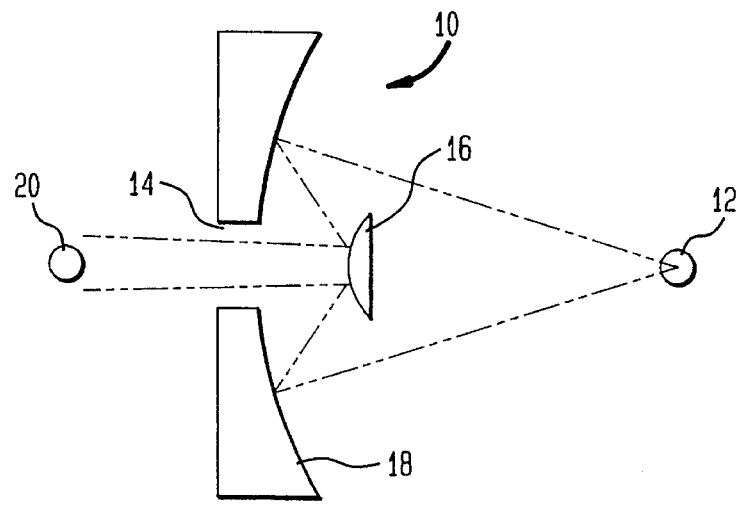
FIGS. 1a and 1b are cross-sectional side and top views, respectively, of a reflective objective lens.
Figure 1B:
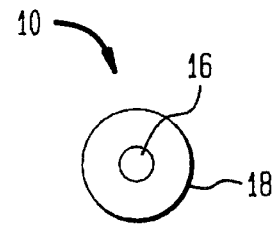

FIGS. 1a and 1b show a generalized reflective objective lens 10. Schwarzchild objectives are commercially available from Ealing Electro Optics and are typical examples of reflective objective lenses. In a first mode of operation, a cone of light emanating from site 12 is directed towards aperture 14. The back of a centrally located convex mirror 16 obscures aperture 14, such that the annulus of light that is transmitted through the aperture 14 is first reflected from concave mirror 18 towards convex mirror 16, and is subsequently reflected out the aperture 14 towards site 20. In a second mode of operation, light is projected from site 20 through the aperture 14. Aperture opening 14 prevents the light reflecting from convex mirror 16 from being directly transmitted to site 12. In this mode of operation, the transmitted light is reflected from convex mirror 16 towards concave mirror 18, and that which is not transmitted back through aperture opening 14 is subsequently directed towards site 12.

In either mode of operation, the central obscuration presented by convex mirror 16 makes the reflective objective-lens 10 sensitive to both spatial and angular uniformity of projected light emanating from an aperture or mask at the object plane of the lens. Spatial uniformity is measured by determining the energy distribution across the cross-sectional area of a beam, for instance at the aperture, mask, or workpiece. Good spatial uniformity is achieved when the amount of energy at each point in the aperture or mask is approximately the same. Angular uniformity is a measure of the range of angles of illumination exiting each spatial point in the aperture. If each spatial point of the aperture is not emiting the same or approximately the same range of angles of illumination, the projected image will not be spatially uniform due to the light obscuration within the reflective objective.

An important aspect of this invention is related to accurately measuring the uniformity of energy at the workpiece plane and the effects of the aperture that effect both the spatial and angular non-uniformities of the beam across the workpiece. It has been discovered that if the optics that are imaging the aperture are reflective instead of refractive, measuring the uniformity at the aperture with refractive optics does not give a true representation of the uniformity at the workpiece. Currently, many laser systems use a reflective lens to make an image of an aperture or mask on the work piece. The aperture is illuminated with laser light, and is reduced to a small size on the work piece. Often, the "uniformity" is measured with refractive optics by imaging the aperture to a camera and using a beam uniformity system to look at the energy distribution across the aperture. As discussed above, this is a measure of spatial uniformity. If the aperture plane does not have good spatial uniformity (i.e., the amount of energy in each point of the aperture is not the same), it will show up on the laser beam analysis system and on the work piece.

Spatial uniformity at the aperture is not solely responsible for the spatial uniformity at the work piece when using reflective objectives. Specifically, reflective objectives also require very good angular uniformity at the aperture or mask to have a spatially uniform image at the work piece. Because refractive optics only have sensitivity to spatial uniformity, not angular uniformity, the variation of angles of light through the aperture or mask will affect the spatial uniformity of the image at the work surface, but not the image detected by the beam diagnostic system if the beam diagnostic system uses refractive optics and the imaging system to the work piece uses reflective optics. An important aspect of this invention is related to providing laser systems with reflective objectives with a more accurate means for determining beam uniformity at the work surface.

Figure 2A:
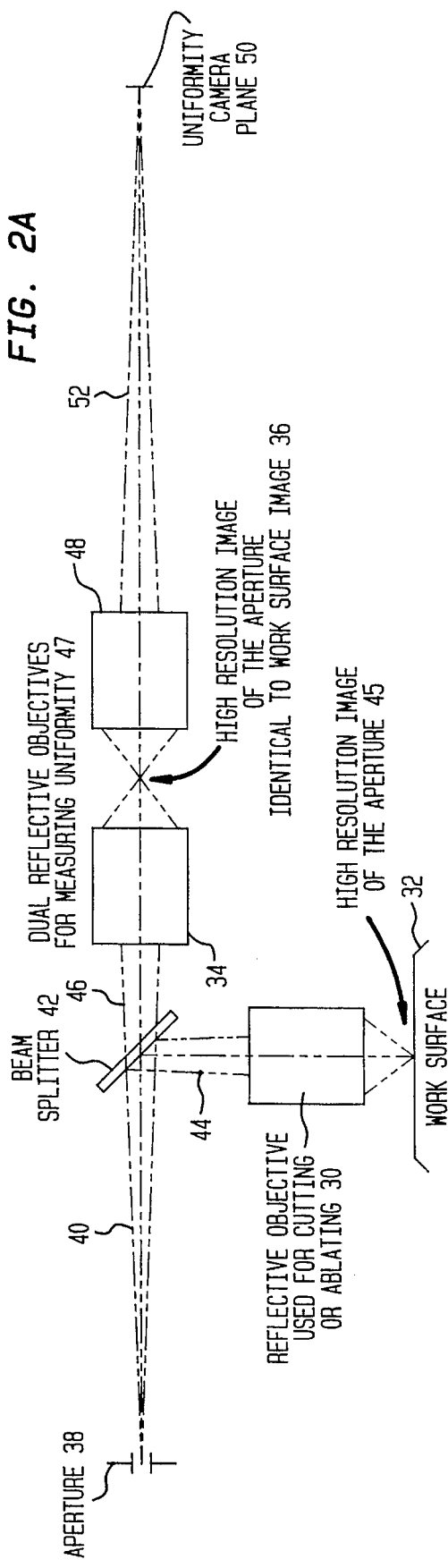
FIGS. 2a and 2b are schematic diagrams of a laser imaging system which can accurately measure the uniformity of light emanating from the aperture which is affected by both spatial and angular non-uniformities of the light.
Figure 2B:
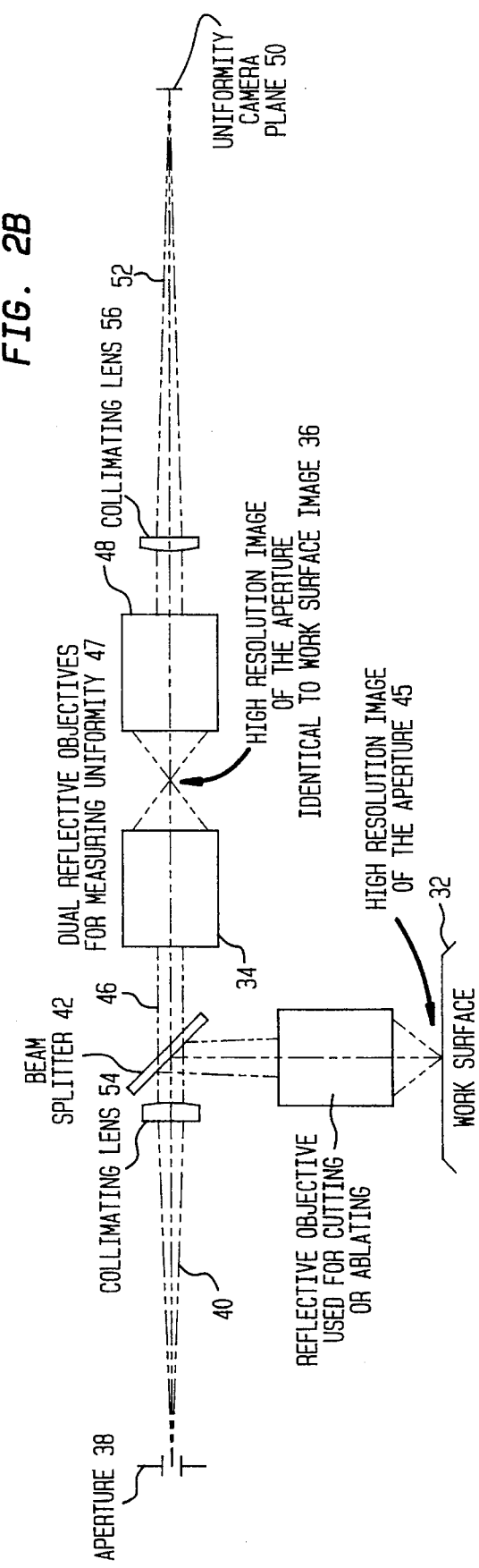

FIGS. 2a and 2b show the preferred method of achieving an accurate uniformity diagnostics system for a laser tool which utilizes a reflective objective 30. In FIGS. 2a and 2b, the laser (not shown) is preferably an excimer laser, and the tool is used for cutting or ablating material on a work surface 32. However, it should be understood that many different types of lasers, including ion, YAG, and $CO_2$ lasers can be used in the practice of this invention, wherein the laser can operate in either the continuous wave or pulsed mode, and that the laser process can be used for processes other than ablating (e.g., deposition, ion implantation, etc.).

This invention contemplates creating the same pupil that is used for imaging the work piece in the beam uniformity measuring system. Specifically, a second reflective objective lens 34 identical to reflective objective lens 30 is positioned in the beam uniformity measuring system such that a high resolution image 36 of the aperture or mask 38 is obtained which is identical in uniformity to the work surface 32 image.

In operation, laser light 40 emanating from an aperture or mask 38 used to pattern the work surface 32 is divided by a partially transmissive beam splitter 42. Depending on the application, the laser light can be ultraviolet, visible, or infrared. The beam splitter 42 preferably transmits less than 10% of the laser light 40, and most preferably transmits 1% or less of the laser light 40, and reflects the remainder. Thus, the majority of the laser energy is directed towards the work surface 32. Beam splitters 42 which are suitable for the practice of this invention are available from Acton Research Corporation of Acton, Mass.

Reflected light 44 is then passed through a reflective objective lens 30, similar to that described in conjunction with FIGS. 1a–b, and a high resolution image 45 of the aperture is projected onto the work surface 32 to pattern the work surface. Preferably, the reflective objective lens 30 has a high numerical aperture between 0.3 and 0.8. Suitable reflective objective lenses are available from Ealing Electro Optics and IBM Optical Development Services.

Transmitted light 46 is then passed through a reflective objective lens 34 which has the identical properties of reflective objective lens 30. This creates an image 36 which is identical to that which appears on the work surface. The image 36 is the same in size, resolution, and uniformity as that of the work surface image. FIGS. 2a and 2b show that the image 36 is passed through a third reflective objective lens 48 that is identical in properties to the reflective objective lenses 30 and 34. However, it should be understood that if the image 36 is big enough, a beam diagnostic system can detect it at the image location of the reflective objective lens 34. In addition, if the image 36 needs to be magnified, refractive optics (not shown) can be used to relay the image to the beam diagnostics system because both angular uniformity and spatial uniformity have been maintained by reflective objective 34.

FIGS. 2a and 2b show a preferred embodiment with a dual reflective objective system 47 where a third, identical, reflective objective 48 is used. In a high resolution system, the image 36 may be very small and may have a very large numerical aperture, such as 0.5 and above. By using an identical reflective objective 48 to pick up the image 36 and re-image it, the numerical aperture and resolution are maintained, and the resultant image impinging on the beam uniformity detector 50 is the same size as the aperture or mask 38. Additional refractive lenses (not shown) can be placed in the path of the diagnostic beam to enlarge the image impinging on the detector of the beam uniformity system 50. Preferably, a charge coupled device (CCD) or similar device receives the diagnostic beam 52. The beam uniformity system 50 analyzes the spatial uniformity of the diagnostic beam 52, and that spatial uniformity precisely matches the spatial uniformity of the laser light 40 emanating from aperture 38. This ensures that the camera detector at the uniformity camera plane of the beam uniformity system 50 detects a beam which is exactly the same as that which impinges on the work surface 32. The measurements are made by standard techniques using conventional instrumentation. An example of suitable beam uniformity system, 50 within the practice of this invention is the Spiracon spatial beam profiler (Bigsky is another example).

FIG. 2b shows an identical beam uniformity detection sub-system as that disclosed in FIG. 2a, except that collimating lenses 54 and 56 have been added to laser light beam 40 and diagnostic beam 52. The collimating lenses 54 and 56 provide the advantage of providing a collimated image of the aperture 38. This arrangement is advantageous because the collimated light path creates a more versatile system for changing magnifications and also makes the system easier to align.

Figure 3:
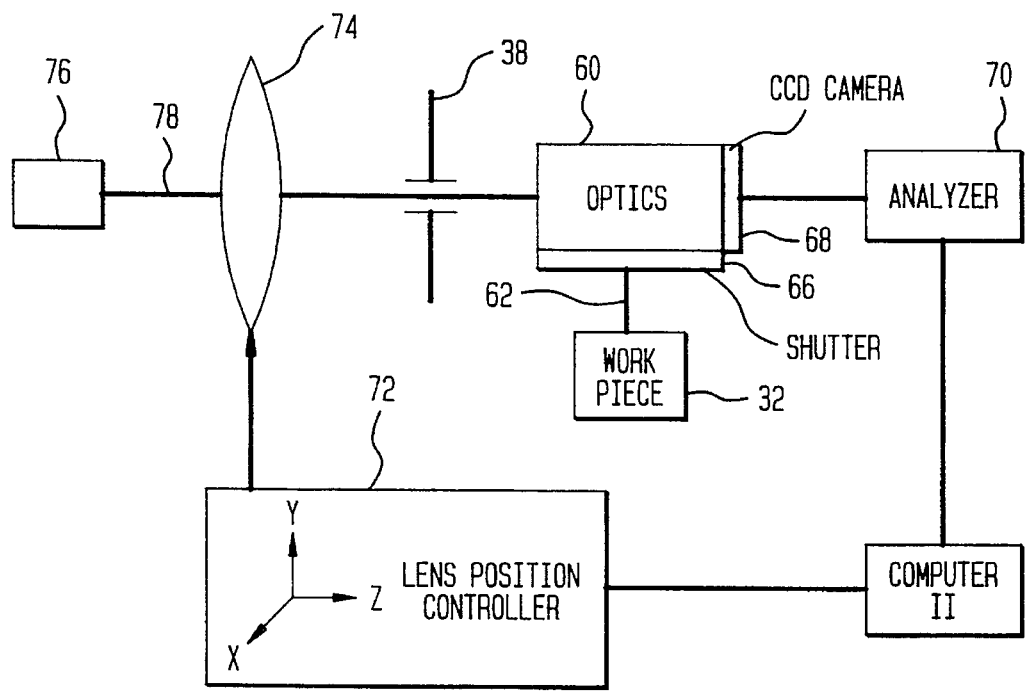
FIG. 3 is a block diagram of a closed loop feedback control arrangement to be used in conjunction with the laser imaging systems shown in FIGS. 2a and 2b.

FIG. 3 shows another important aspect of this invention which allows for real-time work surface uniformity control. The aperture 38 and optics 60 are preferably identical to those described in conjunction with FIGS. 2a and 2b. However, a wide variety or specific optical schemes could serve as "optics" for this real-time uniformity control system. Path 62 is the work piece beam which images the aperture onto the work piece 32.

Positioned in path 62 is a shutter 66 or other mechanism for preventing laser energy from impinging on the work piece 32. This is employed during set-up.

FIG. 3 shows a real-time closed-loop control system. The spatial and angular uniformity requirements will vary depending on the application.

The beam uniformity system is comprised of a camera 68 for sensing a diagnostic beam transmitted through the optics 60 and a beam uniformity analyzer 70 which determines the spatial uniformity of the transmitted beam. As discussed above, because optics 60 includes identical reflective objective lenses in the work piece and diagnostic pathways, the beam uniformity system is exposed to a beam having the same uniformity as the work piece 32. An example of a beam analyzer useful in the practice of this invention is the Spiracon spatial beam profiler; however, a wide variety of other beam analyzers which can detect the spatial uniformity of the beam can be employed. The beam analyzer 70 outputs feedback information based on accumulated spatial uniformity data compared to statistical information to a lens position controller 72. The lens position controller 72, in turn, adjusts the position of a spherical converging lens 74 positioned in front of the aperture or mask 38 that directs laser energy from source 76 through the aperture or mask 38 towards optics 60. Although not shown, the lens 74 can be an anamorphic focussing lens instead of a spherical converging lens.

The converging lens 74 is sometimes referred to as a pre-aperture converging optic or PACO lens. In FIG. 3, the z-dimension is shown along line 78, and the x- and y-dimensions are perpendicular to the z-dimension. Moving the PACO lens 74 in the z-dimension varies the energy level of the laser beam projected into optics 60. In many laser ablation applications it would be useful to have the PACO lens 74 control the energy level to a level between 50 and 200 milliJoules (mJ). The PACO lens is preferably positioned in the z-dimension such that its focal point is at point beyond the aperture or mask 38. This creates the optimum angular uniformity that is required. When the source 76 is an excimer laser, the PACO lens preferably is made from crystal, quartz, calcium fluoride, or barium fluoride. The x- and y-dimensions control how well the laser beam is centered on aperture 38. While centering the laser beam on the aperture 38 has only minimal effect on the spatial uniformity, it has a significant impact on the angular uniformity of the laser energy at the aperture or mask 38.

During operation of the laser system, the uniformity of the laser beam at the aperture may drift due to mechanical and electrical changes in the system and thermal effects. FIG. 3 shows that during operation of the laser system, the uniformity is sensed by analyzer 70 and changes in spatial and angular uniformity are compensated for in real time by adjusting PACO lens 74. One means for accomplishing this would be to tabulate and compare the detected signal at the beam analyzer with an existing model which portrays a tophat, uniform energy distribution, or very square spatial image of the energy. If the uniformity is within certain thresholds, the laser process continues unchanged. However, if the uniformity is not within specified limits, the beam analyzer interrupts the process, and a calibration is performed with the lens position controller 72 adjusting the position of the PACO lens 74. PACO lens 74 adjustments can also be accomplished by other means.

Preferably, the adjustments can be made in three dimensions. A Klinger servo system, available from the Klinger company could be used to adjust the position of PACO lens 74 in accordance with beam analyzer 70 information. Thus, this invention particularly contemplates a closed loop servo and beam profiling system being used to achieve uniformity at the aperture or mask 38. In a pulsed excimer laser system which is used in a deletion and ablation operation, the energy per delete is very critical due to the fact that one will often delete or ablate down to a certain level of the substrate and not damage the existing levels underneath. Levels are within microns of each other. This system allows adjustments on a shot to shot basis. For multi-shot applications, the beam analysis system can collect data of uniformity on a per shot basis compared with statistical models and direct adjustments of the PACO lens through the lens position controller for follow on shots such that the desired final workpiece profile is achieved without interrupting for calibration.

Another important aspect of this invention is related to improved techniques for homogenizing a laser beam such that the spatial uniformity of the beam is optimized and energy losses are reduced. One technique for homogenizing the beam utilizes fiber optic bundles. Another technique for homogenizing the beam utilizes a wire mesh. Both techniques, as well as other homogenization techniques, can be used in conjunction with the laser system described in conjunction with FIGS. 1–3. Specifically, homogenizing the laser beam emanating from the source will help achieve spatial uniformity at the aperture. In addition, energy losses which occur in reflective objective lenses, such as Schwarzchild objectives, can be reduced. The homogenizing techniques discussed below can also be used in other laser systems which do not employ the optical systems described above.

FIG. 4 is a schematic diagram of a fiber optic sub-system designed to improve the spatial intensity of light output from a laser. Excimer lasers output a laser beam with a generally square to rectangular profile. The spatial intensity is typically non-uniform in at least one axis. FIG. 4 shows collecting laser light 80 from source 82, which is preferably an excimer laser, within a plurality of fiber optic bundles 84. The fiber optic bundles preferably are made of quartz material and have individual fiber diameters on the order of microns.

As is best shown in 5a, the fiber optic bundles 84 are collected together as input end 86 that is generally square or rectangular in shape. In one embodiment, the input end 86 is on the order of 25 mm on a side. FIG. 5b shows that the individual fibers A—A, A'—A', B—B, B'—B', C—C, and C'—C' are arranged, such as inside a housing 88, to redistribute the peak of the central area of the Gaussian input energy from the laser 82 in a homogenous manner. All the B–B' fibers from the central area are displaced throughout various points in the annulus to homogenize the intensity cross-section of the annulus output. By intermingling fibers centrally located in FIG. 5a (which are labelled B and B' and which pick up the peak intensity of the Gaussian laser input beam) with fibers located in the peripheral regions of FIG. 5a (which are labelled both A, A' and C, C' and which pick up the low intensity portions of the Gaussian tails of the input laser beam) randomnly among each other, dispersing B's amongst A's and C's, the light output at the end of the fiber optic housing 88 is homogenized. Thus, the systematic orientation of the fibers provides more spatially uniform laser light at its output end.

The annular configuration of the fiber optic bundles at 84 at the output end 90 of the housing 88 shown in FIGS. 4 and 5c has particular utility when a reflective objective lens is used for focussing the light on a work piece 94. As discussed above, reflective objective lenses have a central obscuration which blocks light in the central area of the pupil within the lens such that an annulus shape remains to transmit light. With respect to FIG. 4, convex mirror 96 will block light from being transmitted directly to work piece 94 and will reflect the transmitted light towards concave mirror 98, which then projects the light towards 94. In a typical laser system, the central obscuration results in the loss of 12–20% of the laser energy at the reflective objective lens 92. This is due to a good portion of the light being reflected back through the opening in concave mirror 98. However, with this invention, the energy typically lost by the central obscuration of the reflective objective (Schwartzchild objective) is preserved by the fiber arrangement. This is because all of the energy from a rectangular or square input is redirected to an output annular in shape. This annular shape is then imaged by a condenser lens 91 to the pupil of the reflective objective lens 92. The annular shape is imaged into the reflective objective lens 92 in a fashion where the loss from light reflected back through the concave mirror 98 is reduced or eliminated. The dimensions of the reflective objective pupil and the parameters of the beam delivery system need to be considered when determining the dimensions of the fiber optic sub-system's output end. For example, in the one embodiment discussed above where the input end is 25 mm on a side, the outer diameter of the annulus may be 13 mm and the inner diameter of the annulus may be 6 mm.

FIG. 4 also show that the output end 90 can be directed through an aperture 100. Thus, the homogenization technique shown in FIGS. 4 and 5, may be used in combination with the uniformity measurement and control techniques discussed above in conjunction with FIGS. 1–3.

Although not shown in FIG. 4, telecentric beamshaping optics may be used for inputing the raw laser energy from source 82 into the fiber unit 88. In addition, for other applications, the fiber unit 88 may be designed to output different shapes of light at the output end 90.

Figure 6:
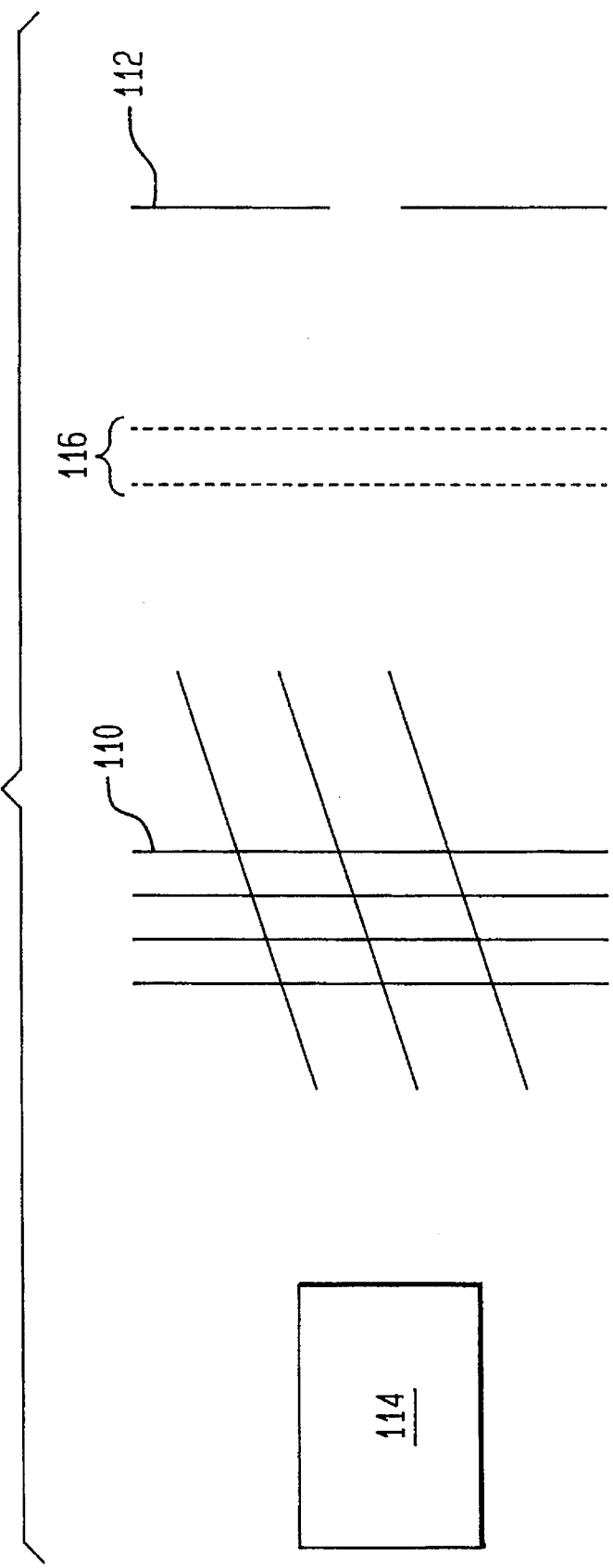
FIG. 6 is a schematic view of a laser homogenization system which utilizes mesh screens positioned in the path of the laser beam prior to the aperture or mask.

FIG. 6 is a schematic view of a laser homogenization system which utilizes a mesh screen 110 or combination of mesh screens positioned in the path of the laser beam prior to the aperture 112. The homogenization system of FIG. 6 can be used in combination with the laser system of FIGS. 1–3 and in a variety of other laser systems to achieve beam homogenization. Laser energy from source 114 impinges on the screen 110, and the screen 110 randomly disperses the laser beam to form diverging angluar beamlets of light. The screen also attenuates portions of the non-uniform spatial intensity of the laser. The intensity from each point in the screen plane spreads to cover a larger area some distance past the screen plane. The intensity from many of the individual diverging beamlets overlaps to illuminate the aperture or mask 112 with light of both uniform spatial and angular intensity.

The configuration and size of the screen 110 can be varied to meet the desired uniformity. Preferably, the screen 110 will be a wire mesh made from brass, stainless steel, or aluminum to withstand the laser energy, and will have a crossing pattern of 50 to 500 wires per inch (pitch is equal to wires per inch). Use of a mesh above a pitch of 500 may result in too much laser energy attenuation. Preferably the crossing pattern will range between a pitch of 50 and 100 or 200. As noted above, several screens, as indicated by dashed lines 116, can be positioned in series in front of the aperture or mask 112 to achieve a large number of overlapping beamlets. In systems with several screens, each of the screens may be oriented with the crossing pattern at a different angle or each of screens could have a different pitch, such that each successive screen continues to divide the beamlets into additional, overlapping beamlets. The degree of homogenization of a laser beam can be controlled by selectively inserting different screens of different pitches or different combinations of screens in the path of the laser beam in front of the aperture or mask 112. With respect to FIGS. 2 and 3, the screen 110 can be positioned after the PACO lens 74 and in front of aperture or mask 38, or in combinations in front of and behind PACO lens 74. The screens 110 and 116 are preferably used before the aperture to increase the energy density at the aperture 112 plane.

While the invention has been described in terms of its preferred embodiments, those skilled in the art will recognize that the invention can be practiced with modification within the spirit and scope of the appended claims.

We claim:

1. A laser system, comprising:

an aperture or mask through which a laser beam from a source is transmitted;

a means for dividing laser energy emanating from said aperture or said mask into work piece and diagnostic beams;

two identical reflective objective lenses, a first of said reflective objective lenses positioned in the path of said work piece beam and directing a first image of said aperture or said mask onto a work piece, a second of said reflective objective lenses positioned in the path of said diagnostic beam and creating a second image of said aperture or said mask, said first and second images having identical uniformity; and a beam uniformity analyzer which determines a uniformity of said laser beam at said second image of said aperture or said mask.

2. The laser system of claim 1 further comprising a means for enlarging said diagnostic beam prior to being detected by said beam uniformity analyzer, said means for enlarging being positioned in the path of said diagnostic beam after said second reflective objective lens.

3. The laser system of claim 1 further comprising a third reflective objective lens positioned in the path of said diagnostic beam after said second reflective objective lens and before said beam uniformity analyzer.

4. The laser system of claim 3 wherein said third reflective objective lens is identical to said first and second reflective objective lenses.

5. The laser system of claim 1 wherein said means for dividing said laser energy is a beamsplitter which reflects at least 90% of said laser energy as said work piece beam and transmits 10% or less of said laser energy as said diagnostic beam.

6. The laser system of claim 1 further comprising a means for adjusting the uniformity of said laser beam at said aperture or said mask based on information determined by said beam uniformity analyzer.

7. The laser system of claim 6 wherein said means for adjusting the uniformity of said laser beam at said aperture or said mask comprises:

a lens positioned between said source and said aperture in the path of said laser beam produced by said source, said lens directing said laser beam towards said aperture or said mask;

a positioning means for adjusting the position of said lens relative to said aperture or said mask to adjust the uniformity of said laser beam at said aperture or said mask.

8. The laser system of claim 7 wherein said positioning means is responsive to information determined by said beam uniformity analyzer.

9. The laser system of claim 7 wherein said lens can be moved in three dimensions relative to said aperture or said mask.

10. The laser system of claim 7 wherein said lens is positioned to focus said laser beam to a point beyond said aperture or said mask.

11. The laser system of claim 6 further comprising a means for blocking said work piece beam from impinging on said work piece, said means for blocking operating in conjunction with said means for adjusting.

12. The laser system of claim 1 further comprising a means for homogenizing said laser beam from said source.

13. The laser system of claim 12 wherein said means for homogenizing comprises an optic positioned between said source and said aperture, said optic comprised of a plurality of fiber optic bundles, said fiber optic bundles being arranged to redistribute the gausian input energy in a manner whereby central peak energy is randomnly decentralized.

14. The laser system of claim 13 wherein said optic redirects a rectangular laser beam projected at a first end of said plurality of fiber optic bundles to a second end of said fiber optic bundles arranged in an annular shape, and further comprises an imaging lens for imaging said annular shape into an annular pupil of a reflective objective lens.

15. The laser system of claim 13 wherein said fiber optic bundles include quartz fibers.

16. The laser system of claim 12 wherein said means for homogenizing is capable of angularly and spatially homogenizing said laser beam and comprises at least one screen positioned between said source and said aperture or said mask which can divide said laser beam into multiple beamlets.

17. The laser system of claim 16 wherein said screen has a pitch of 50–500.

18. The laser system of claim 1 further comprising first and second collimating means, said first collimating means being positioned to collimate said laser beam emanating from said aperture or said mask, said second collimating means being positioned to collimate said diagnostic beam prior to analysis by said beam uniformity analyzer.

19. A laser system, comprising:

a laser for emitting a laser beam;

a converging lens mounted in alignment with the laser beam for introducing controlled angular variations in the laser beam;

a plate located within the focal distance of the converging lens, the plate having an aperture or mask through which the laser beam travels for creating an image of a desired shape;

a means for dividing the laser beam into primary and secondary beams;

a first reflective objective lens for receiving the primary laser beam and focusing onto a work surface the image of the aperture or the mask;

a second reflective objective lens for receiving and focusing the secondary beam such that a second image is created which duplicates the image focused at the work surface;

a third reflective objective lens for magnifying the second image for inspection and measurement of beam uniformity; and a means for measuring beam uniformity.

20. The laser system of claim 19 further comprising adjusting means for adjusting a position of the converging lens, said means for adjusting being responsive to said means for measuring beam uniformity.

21. The laser system of claim 19 further comprising comprising first and second collimating means, said first collimating means being positioned to collimate said laser beam emanating from said aperture or said mask, said second collimating means being positioned to collimate a beam emanating from said third reflective objective lens prior to analysis by said beam uniformity analyzer.

22. A laser system, comprising:

a homogenizer comprised of a plurality of fiber optic bundles, said fiber optic bundles being arranged to redirect a rectangular laser beam projected at a first end of said homogenizer to an annular shape at a second end of said homogenizing optic, said fiber optic bundles being arranged to redistribute a gaussian input energy in a manner whereby central peak energy is randomly decentralized;

an imaging optic for imaging said annular shape emanating from said second end of said homogenizing optic; and a reflective objective lens having an annular pupil for receiving an image of said annular shape from said imaging optic, wherein said annular shape imaged by said imaging optic matches said annular pupil of said reflective objective lens.

23. A laser system, comprising:

a homogenizer comprised of a plurality of fiber optic bundles, said fiber optic bundles being arranged to redirect a rectangular laser beam projected at a first end of said homogenizer to an annular shape at a second end of said homogenizing optic, said fiber optic bundles being arranged to redistribute a gaussian input energy in a manner whereby central peak energy is specifically arranged to provide uniform output intensity;

an imaging optic for imaging said annular shape emanating from said second end of said homogenizing optic; and a reflective objective lens for receiving an image of said annular shape from said imaging optic.

24. The laser system of claim 23 wherein said fiber optic bundles are comprised of quartz.

25. A laser system, comprising:

a source of laser light;

an aperture or mask, said source of laser light directing laser light towards said aperture or said mask; and a means for homogenizing said laser light located between said source of laser light and said aperture or said mask to provide light of a selected spatial and angular uniformity to said aperture or said mask, said means for homogenizing said laser light comprising at least one screen which can divide said laser light into multiple beamlets, said screen having a crossing pattern having a pitch of less than 500, said screen being positioned a distance from said aperture or said mask sufficient to allow adjacent beamlets emanating from said screen to overlap prior to impinging on said aperture or mask.

26. The laser system of claim 25 wherein said crossing pattern of said screen in said means for homogenizing has a pitch which ranges between 50 and 200.

27. A laser system comprising:

a source of laser light;

an aperture or mask, said source of laser light directing laser light towards said aperture or mask; and a means for homogenizing said laser light located between said source of laser light and said aperture or said mask to provide light of a selected spatial and angular uniformity to said aperture or said mask including a plurality of screens positioned in series, said mask for homogenizing said laser light comprising at least one screen which can divide said laser light into multiple beamlets, said screen having a crossing pattern having a pitch of less than 500, said screen being positioned a distance from said aperture or said mask sufficient to allow adjacent beamlets emanating from said screen to overlap prior to impinging on said aperture or said mask.

28. The laser system of claim 27 further comprising a means for selecting a screen or combination of screens to achieve a desired degree of homogenization, said means for selecting controlling the screen or combination of screens placed in the path of said laser light.

29. The laser system of claim 27 further comprising a lens positioned between at least two of said plurality of screens.

* * * * *